(12) United States Patent
Beckford

(10) Patent No.: US 9,135,581 B1
(45) Date of Patent: Sep. 15, 2015

(54) RESOURCE CONSTRAINED TASK SCHEDULING

(75) Inventor: Jonah Beckford, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 309 days.

(21) Appl. No.: 13/223,132

(22) Filed: Aug. 31, 2011

(51) Int. Cl.
*G06F 9/46* (2006.01)
*G06Q 10/04* (2012.01)

(52) U.S. Cl.
CPC ........................... *G06Q 10/04* (2013.01)

(58) Field of Classification Search
None
See application file for complete search history.

(56) References Cited

U.S. PATENT DOCUMENTS 5,408,663 A * 4/1995 Miller ........................... 718/104
6,757,897 B1 * 6/2004 Shi et al. ....................... 718/102
2009/0119237 A1 * 5/2009 Triantafillidis ................. 706/19
2009/0125909 A1 * 5/2009 Li et al. ......................... 718/103
2010/0115526 A1 * 5/2010 Mincarelli ..................... 718/104

OTHER PUBLICATIONS

Resource-Constrained Project Scheduling (Rolf et al. 1999).*

* cited by examiner

*Primary Examiner* — Sisley Kim
(74) *Attorney, Agent, or Firm* — Lee & Hayes, PLLC

(57) ABSTRACT

The use of linear programming may enable the achievement of real-time task execution prioritization. A linear model may be constructed based at least on a set of computing tasks, a linearly expressible goal for the set of computing tasks, one or more linear resource constraints, and one or more computing task dependencies. The linear model is then used to calculate a shadow price for each of a plurality of resource time prediction constraints, in which each shadow price may represent a priority value for a corresponding computing task. When a computing resource becomes available, a computing task with a highest priority value that is able to use the computing resource may be executed.

26 Claims, 4 Drawing Sheets

RESOURCE CONSTRAINED TASK SCHEDULING

BACKGROUND

A business enterprise may rely on data warehouses and computing services to store and process data that facilitate daily operations. The data warehouses may reside on various servers, each potentially having different characteristics and capabilities. During operations, entities within the business enterprise may use the computing services and the data stored in the data warehouses to complete different tasks. For example, a computing task may be a creation of a data report, such as a financial report, a sales projection report, or an inventory information report. However, in some instances, the ability of an entity to complete the computing task may be constrained by the entity's dependency on data that is generated and placed into the data warehouses by other entities. The ability of the entities to complete their respective tasks may be further constrained by the processing capability of the servers that host the database warehouses and the computing services, as well as the computing task workload that is placed on the servers by the various entities. Additionally, different entities may request different task completion times, which may add another layer of complexity to the scheduling of computing tasks for execution.

Thus, in scenarios in which the data stored in the data warehouses and the computing services are used by multiple entities to complete a significant number of tasks, the prioritization of such tasks for execution may become increasingly complex. Accordingly, as the number of tasks increases, it may become infeasible for a human operator to make decisions regarding the order in which the computing tasks are to be efficiently executed.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
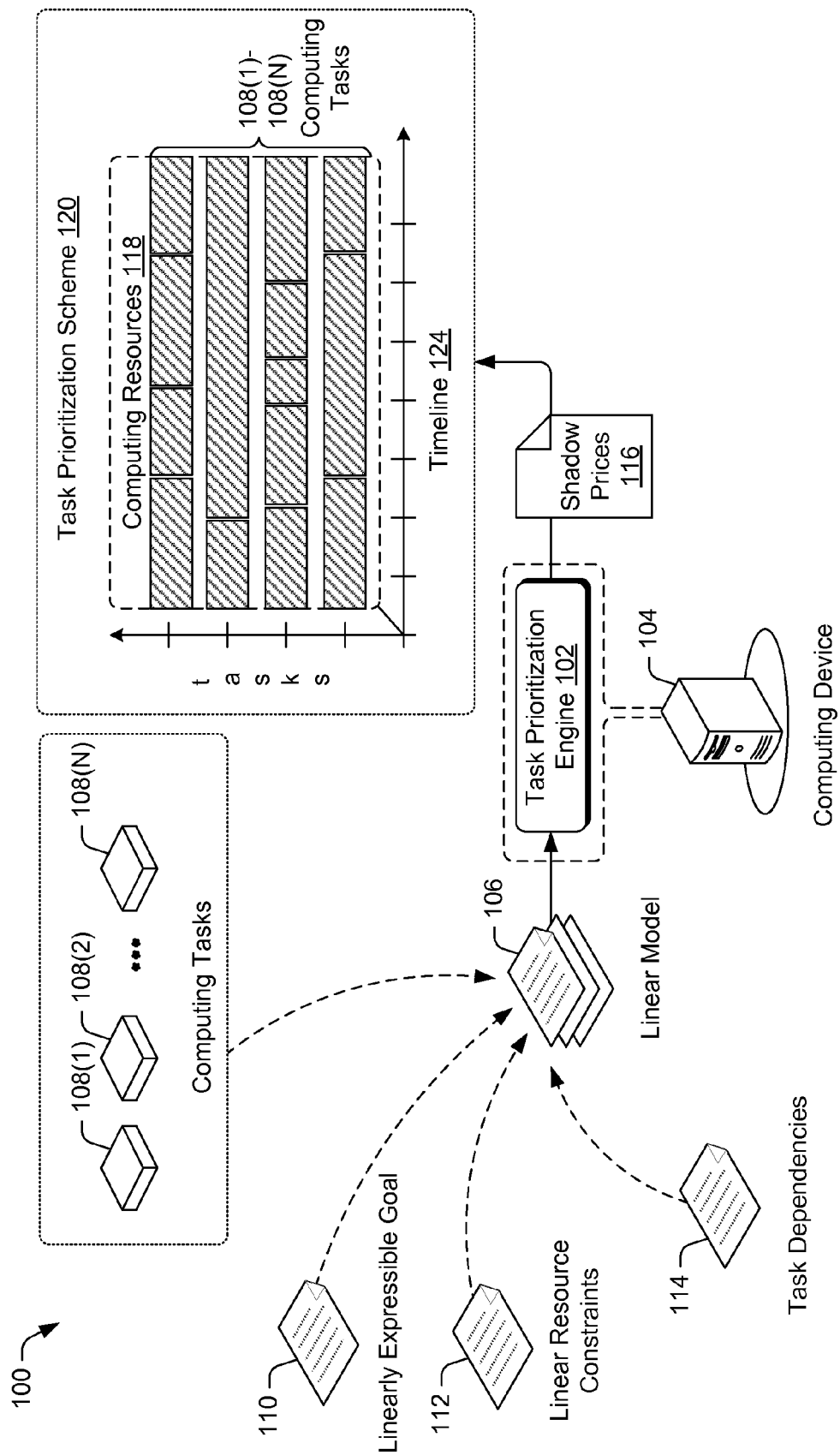
FIG. 1 is a schematic diagram of an illustrative computing environment for implementing various embodiments of resource constrained task scheduling using linear programming.

This disclosure is directed to techniques that leverage linear programming to prioritize the execution of computing tasks using constrained computing resources. A linear model that is generated for prioritizing the execution of computing tasks may include a set of computing tasks to be performed, a linearly expressible goal, one or more linear resource constraints, and one or more task dependencies. In one example, the set of computing tasks may include the generation of data reports based on information stored in one or more data warehouses. The linearly expressible goal may be to maximize profit from the performance of the computing tasks, minimize a cost associated with the performance of the computing tasks, minimize duration of the computing tasks, and/or other linearly expressible goals. The one or more linear constraints may reflect limitations on the availability of computing resources, such as the limited storage capacity of each data warehouse or a limited number of data servers to fulfill computing task requests. The one or more task dependencies may include a stipulation that a first computing task of the computing tasks is to be executed prior to the execution of a second computing or other types of task dependencies. The computing task prioritization is a determination of the order in which each of the computing tasks to be executed given the availability of computing resources and task dependencies at various times.

The techniques described herein may use linear programming to calculate a shadow price for each resource time prediction constraint in the linear model, in which each of the shadow prices represents a priority value for a corresponding task. The calculation of the shadows prices may be performed at an initial point during prioritization. In some embodiments, the shadow prices may also be recalculated when the computing tasks change significantly or on a periodic or random basis. Accordingly, when a computing resource become available, a computing task having a highest priority value that is able to use the computing resource may be selected for execution using the available computing resource. Thus, the techniques may execute the computing tasks in a way that satisfies or substantially satisfies the linearly expressible goal.

The calculation of the shadow prices for the computing tasks based on the linear model may be a computationally intensive operation that consumes a significant amount of time and computing resources. In contrast, once the shadow prices that represent corresponding priority values are calculated, the selection of a task for execution based on the priority values of the computing tasks and the ability of each task to use an available computing resource may be a relatively simple operation that is performed with minimal lag time. Thus, by structuring the linear programming to calculate the shadow prices beforehand or on an infrequent basis and then using the shadow prices to priorities computing tasks, the techniques described herein may achieve real-time or near real-time task execution prioritization.

In various embodiments, a linear model may be constructed based at least on a set of computing tasks, a linearly expressible goal for the set of computing tasks, one or more linear resource constraints, and one or more computing task dependencies. The linear model is then used to calculate a shadow price for each of a plurality of resource time prediction constraints, in which each shadow price may represent a priority value for a corresponding computing task. When a computing resource becomes available, a computing task with a highest priority value that is able to use the computing resource may be executed.

Illustrative System Architecture

FIG. 1 shows an illustrative computing environment 100 for implementing various embodiments of resource constrained task scheduling using linear programming. The environment 100 may include a task prioritization engine 102 that is implemented by a computing device 104. The computing device 104 may be a general purpose computer, such as a server, a desktop computer, and/or the like. In some embodiments, the computing device 104 may be a plurality of networked servers, such as servers operating in a cloud computing service.

The computing task prioritization engine 102 may process a linear model 106 to prioritize the execution of computing tasks using constrained computing resources. Each computing resource may include data that is stored in one of multiple data warehouses, a data processing capability of a server, or a combination of data and data processing capacity of the data warehouse or the server. The linear model 106 may include user provided parameters that determine the prioritization. In various embodiments, the linear model 106 may include a set of computing tasks 108(1)-108(N) that are to be completed. The computing tasks 108(1)-108(N) may be selected from a larger set of computing tasks. Each of the computing tasks may include the processing of data and/or the generation of output data based on input data. For example, the computing tasks may include the generation of data reports from information stored in one or more data warehouses.

The linear model 106 may also include a linearly expressible goal 110 that is an objective or multiple objectives that are solvable using linear programming. For example, the linearly expressible goal 110 may be to maximize profit from the performance of the computing tasks, to minimize cost associated with the performance of the computing tasks, and/or to minimize duration of the computing tasks, among other possible linearly expressible goals. The linear model 106 may further include one or more linear resource constraints 112 that reflect limitations on the availability of computing resources. For example, the linear resource constraints may reflect the limited storage capacity or a bandwidth of each data warehouse, the limited number of data servers to fulfill data processing requests, and/or other resource constraints.

Additionally, the linear model 106 may include one or more task dependencies 114 that affect the order in which one or more computing tasks may be executed. For example, a task dependency may be a stipulation that a first computing task is to be executed prior to the execution of a second computing task. Another example task dependency may be that a particular task is to be executed by a specific time.

In various embodiments, the computing task prioritization engine 102 may use linear programming to calculate shadow prices 116 for the resource time prediction constraints. The resource time prediction constraints may stipulate that each computing task is to execute in the amount of time that it is predicted to use for execution. In other words, the predicted task completion time of each task may play a role in the calculation of the shadow prices 116. In such embodiments, each of the shadow prices may represent a priority value for a corresponding task. In the context of the linear model 106, each of the priority values may have a formal and well defined meaning: if a task were to take one more unit of resource time (the product of resource usage by a task and a duration of the task) from the optimally output decisions, the overall goal would increase by a k*N units, in which k is a constant and N is the priority value.

Accordingly, when one of the computing resources 118 becomes available any moment in time, the computing task prioritization engine 102 may use the shadow prices 116 to select a task with a highest task priority value that is able to use the computing resource 118. The selected task is then executed using the available computing resource. Accordingly, the computing task prioritization engine 102 may cause the computing tasks 108(1)-108(N) to be executed in a way that satisfies or substantially satisfies the linearly expressible goal while being confined by the linear resource constraints 112 and the task dependencies 114.

For example, as shown in an example task prioritization scheme 120, when the linearly expressible goal is to perform the computing tasks 108(1)-108(N) in the shortest time duration, the computing task prioritization engine 102 may use the shadow prices 116 to order the performance of the computing tasks 108(1)-108(N). The ordering of the performance may maximize the efficient use of the computing resources 118 along a timeline 124 and minimize idle time of the computing resources, even when the ordering is constrained by the computing resource limitations, one or more stipulated deadline, and/or one or more data dependency restrictions.

In some embodiments, any new task that is introduced during task prioritization by the computing task prioritization engine 102 may be configured to take a default average shadow price (i.e., priority value). Further, the shadow prices 116 may be recalculated on a periodic or random basis using updated predicted task completion times of the new tasks, which may adjust any newly added average shadow price.

Illustrative System Components

Figure 2:
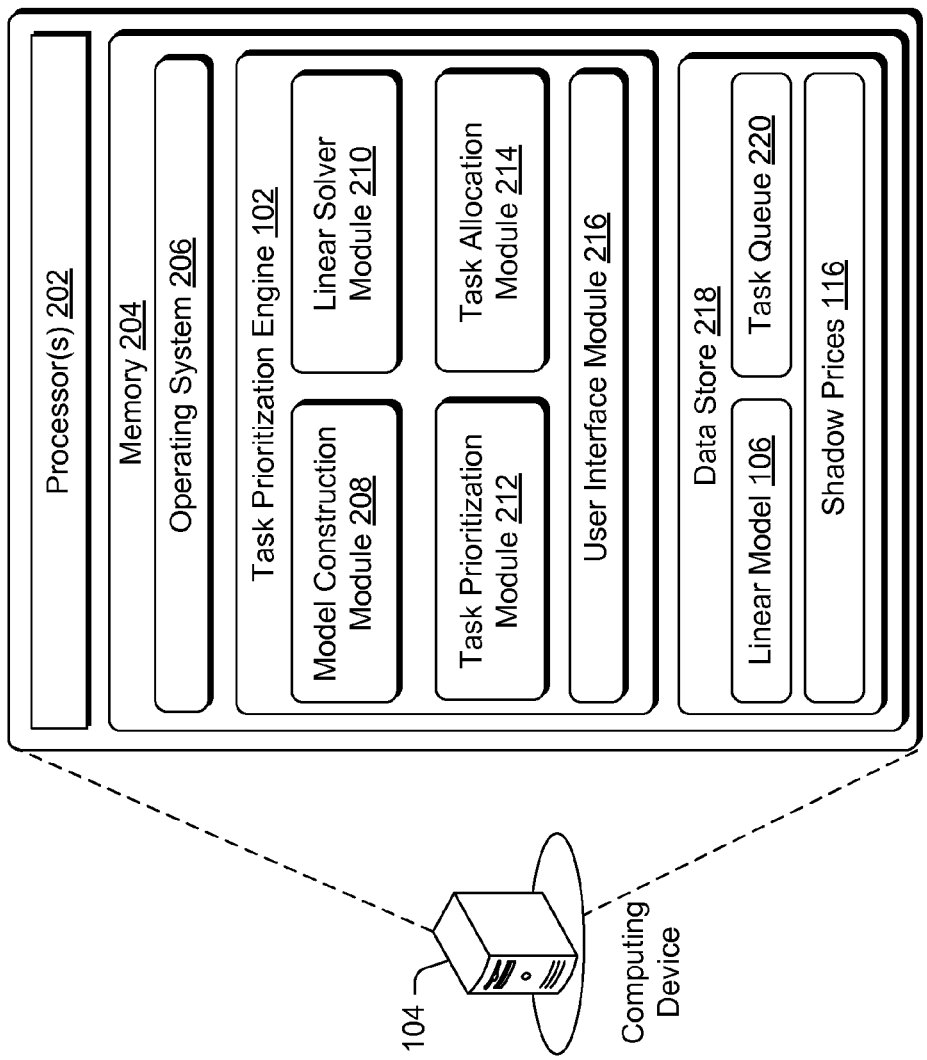
FIG. 2 is a schematic diagram of illustrative components in an example task prioritization engine that performs the resource constrained task scheduling using linear programming.

FIG. 2 shows illustrative components in the task prioritization engine 102 that performs the resource constrained task scheduling using linear programming. The computing task prioritization engine 102 may be implemented by the computing device 104. The computing device 104 may include processor(s) 202 and memory 204. An operating system 206 may be stored in the memory 204. The memory 204 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as a carrier wave, or other transmission mechanism.

The operating system 206 may include components that enable the computing device 104 to receive data via various inputs (e.g., user controls, network interfaces, and/or memory devices) and process the data using the processors 202 to generate output. The operating system 206 may further include one or more components that present the output (e.g., display an image on an electronic display, store data in memory, transmit data to another electronic device, etc.). Additionally, the operating system 206 may include other components that perform various other functions generally associated with an operating system.

The computing task prioritization engine 102 may include a model construction module 208, a linear solver module 210, a task prioritization module 212, and a task allocation module 214, and a user interface module 216. The modules may include routines, programs instructions, objects, and/or data structures that perform particular tasks or implement particular abstract data types. The computing device 104 may also implement a data store 218 that stores data used by the computing task prioritization engine 102.

The model construction module 208 may construct a linear model, such as the linear model 106, that includes input parameters. As described above, the input parameters may include a set of computing tasks 108(1)-108(N), a linearly expressible goal 110, one or more linear resource constraints 112, and one or more task dependencies 114. However, in some embodiments, task dependencies 114 may be optional, such that the model construction module 208 may construct a linear model that does not include one or more task dependencies 114.

In various embodiments, the input parameters that are received by the model construction module 208 may include both one-time input parameters and real-time input parameters. Accordingly, in the context of the linear model, the one-time input parameters may include the following mathematically defined parameters:

Parameter (1): $T$, which may be the set of all clock ticks used to time the execution of the computing tasks (e.g., computing tasks 108(1)-108(N)) in a time period along a timeline, such as the timeline 124, in which $t_m \in T$, $t_n \in T$, $t_m \leq t_n$ implies that $t_m$ is temporally before $t_n$, $t_0$ is reserved for internal boundary calculations, the start time is $t_1$, and the end time is $t_{end}$. In various embodiments, $t_{end}$ may be configured so that it is of sufficient size to permit all computing resources to perform work, otherwise the linear programming solution may not be solvable. Further, the clock ticks may be laid out based on user selection. For instance, each clock may be evenly spaced apart from the next clock tick: $c(t)=k*t$, in which k is a constant. In another instance, each clock tick may be exponentially spaced apart from the next clock tick: $c(t)= k_1 e^{t*k_2}$, in which $k_1$ and $k_2$ are constants.

The number of clock ticks in the time period may affect the accuracy of the calculation result that is obtained. For example, the accuracy of the calculation result may increase with an increase in the number of clock ticks. However, the computation complexity and computation may also increase with the increase in the number of ticks.

Parameter (2): $c(t)$, where $t \in T$, which is the clock time in seconds past the start time. Further, by definition, $c(t_0)=0$ and $c(t_1)=0$.

Parameter (3): $c^{-1}(c)$, where $c \in [0, \infty)$, which is the clock tick that corresponds to the clock time; equivalently, it is also the inverse of the clock time function. That is, $c^{-1}(c(t))=t$ for all $t \in T$, with $c^{-1}(0)=1$.

Further, in the context of the linear model, the real-time input parameters may also include the following mathematically defined parameters:

Parameter (4): $W$, which is the set of computing tasks that is to be worked on by the computing resources (e.g., computing tasks 108(1)-108(N)). Each task may have a speed at which it may be performed, but each task may not exceed a predefined maximum speed at any given time.

Parameter (5): $R$, which is the set of all computing resources that may work on the set of computing tasks (e.g., computing resources 118).

Parameter (6): $D$, which is the set of all dependencies related to the set of computing tasks (e.g., task dependencies 114).

Parameter (7): $\alpha(w,d)$, where $(w,d) \in W \times D$, which is a binary function that has a value of "1" when the condition that task w does not start before the dependency d is satisfied. Otherwise, the value of the binary function is "0".

Parameter (8): $b(w,d)$, where $(w,d) \in W \times D$, which is a binary function that has a value of "1" when the dependency d is satisfied after the computing task w is complete. Otherwise, the value of the binary function is "0".

Parameter (9): $e(w)$, where $w \in W$, which is a time duration in seconds that a task w is to take to complete when it is executing at the predefined maximum speed. In at least one embodiment, the time duration for task w to be completed may be an exponentially weighted moving average of past execution completion times of the computing task, a simple linear regression by least squares of the past execution completion times, or an support vector machine regression of the past execution completion times.

Parameter (10): $f(w,r)$, where $(w,r) \in W \times R$, which is a binary function that has a value of "1" when the computing task w is able to execute on computing resource r. Otherwise, the value of the binary function is "0".

Parameter (11): $g(w,r)$, where $(w,r) \in W \times R$, which when has a positive nonzero value, indicates that a task w is executing on the computing resource r at the start time $t_1$, and will continue working for $g(w,r)$ seconds. Otherwise, $g(w,r)=0$.

Parameter (12): $h(w,r)$, where $(w,r) \in W \times R$, which is the number of units of the computing resource r that task w uses to execute, if the computing task w is to execute on the computing resource r.

Parameter (13): $j(w,r)$, where $(w,r) \in W \times R$, which when has a positive nonzero value, indicates that the computing task w executing on a computing resource r is to start no earlier than $j(w,r)$ seconds from the start time $t_1$. Otherwise, $j(w,r)=0$.

Parameter (14): $k(r)$, where $r \in R$, which is the total resource units that are allowed to execute on a computing resource r, for any instant of time.

Additionally, the model construction module 208 may also use a set of basic definitions and matrix variables in the construction of the linear model. The basic definitions may be expressed as follows:

Definition (1): $\kappa \in R$, which is a "kill" resource. Thus, if a computing task is assigned to the kill resource, it does not execute.

Definition (2): $i(x)$, where x is any real number, this definition represents the largest integer not greater than x, and may be referred to as the "floor" function.

Moreover, the matrix variables may be mathematically expressed as follows:

Variable (1): $\alpha_{w \in W, r \in R, t \in T} \in [0,1]$, whose value represents a percentage speed at which the computing task w on resource r is working at time t. For example, "0.0" may represent that the computing task w is not working, "0.5" may represent that the computing task w is working at half-speed, and "1.0" may represent that the computing task w is working at the predefined maximum speed.

Variable (2): $\beta_{w \in W, r \in R} [0,1]$, which represents a percentage of the computing task w that is performed on resource r.

Variable (3) $\gamma_{d \in D, r \in R, t \in T} \in [0,1]$, which represents a percentage of the dependency d on the computing resource r that is satisfied at time t.

Variable (4): $\delta_{d \in D, r \in R, t \in T} \in [0,1]$, which represents a percentage of the dependency d on the computing resource r that is both unsatisfied and not being produced at time t.

The model construction module 208 may also receive a linearly expressible goal, such as the linearly expressible goal 110, for input into the linear model. In at least one embodiments, a mathematical expression for achieving the linearly expressible goal may be represented as:

$$\text{Minimize } \Sigma_{w \in} W \Sigma_{r \in} R_{|r=\kappa} \Sigma_{t \in} T_{|t=0}(\xi(w,r,t)\alpha_{w,r,t}) + \Sigma_{w \in} W \Sigma_{r \in} R_{|r=\kappa}(\psi(w,r)\beta_{w,r}) + \Sigma_{d \in} D \Sigma_{r \in} R_{|r=\kappa} \Sigma_{t \in} T_{|t=0}(\chi(d,r,t)\gamma_{d,r,t} - \phi(d,r,t)\delta_{d,r,t}),$$

in which $\xi(w,r,t), \psi(w,r), \chi(d,r,t)$ and $\phi(d,r,t)$ may be any well-defined functions.

Accordingly, when the linearly expressible goal is to perform a set of computing tasks in the shortest time duration, the following goal customization may minimize the square average clock time for all the computing tasks to execute the set of computing tasks as fast as possible:

$$\xi(w, r, t) = \frac{c(t)^2}{e(w)} \quad (1)$$

$$\psi(w,r) = 0 \quad (2)$$

$$\chi(d,r,t)=0 \quad (3)$$

$$\phi(d,r,t)=0 \quad (4)$$

However, in other embodiments, other linearly expressible goals may also be achieved through customization of $\xi(w,r,t), \psi(w,r), \chi(d,r,t)$ and $\phi(d,r,t)$. For example, such linearly expressible goals may include maximization of profit from the performance of the computing tasks, the minimization of cost associated with the performance of the computing tasks, and so on and so forth.

The model construction module 208 may also input a set of linear constraints into the linear model. The set of linear constraints may reflect resource constraints, limitations imposed by task processing constraints, and/or task dependencies. The set of linear constraints may be expressed as follows:

Constraint Group (1): $\forall w \in \{W \mid (\Sigma_{d \in D} a(w,d)) \geq 1\}$ $0 \leq \beta_{w,k} \leq 0$, which stipulates that a computing task is not to be terminated if it depends on another computing task.

Constraint Group (2): $\forall w \in W$ $1 \leq \Sigma_{r \in R} {}_{|f(w,r)=1|} \beta_{W,K} \leq 1$, which stipulates that a computing task may only execute on one computing resource.

Constraint Group (3): $\forall (w,r) \in \{W \times R \mid r \neq \kappa \hat{} g(w,r) > 0\}$ $1 \leq \beta_{w,r} \leq 1$, which stipulates that a computing task is to execute if it is an initial task.

Constraint Group (4): $\forall (w,r,t,d) \in \{W \times R \times T \times D \mid r \neq \kappa \hat{} t > 0 \hat{} f(w,r)=1 \hat{} a(w,d)=1\}$ $\alpha_{w,r,t} - \gamma_{d,r,t} \leq 0$, which stipulates that each consuming computing task cannot execute on a computing resource if a dependency being consumed has not been satisfied.

Constraint Group (5): $\forall (w,r,t) \in \{W \times R \times T \mid r \neq \kappa \hat{} t = 0\}$ $0 \leq \alpha_{w,r,t} \leq 0$, which stipulates that no computing task is to execute in a reserved time slot.

Constraint Group (6): $\forall (w,r) \in \{W \times R \mid r \neq \kappa \hat{} f(w,r)=1 \hat{} g(w,r)=0\}$ $h(w,r)*e(w)*\beta_{w,r} - \Sigma_{t \in T | t > 0} (c(t)-c(t-1))*h(w,r)*\alpha_{w,r,t} \leq 0$, which stipulates that each computing task is to execute in the amount of time that it is predicted to use to execute.

Constraint Group (7): $\forall (w,r) \in \{W \times R \mid r \neq \kappa \hat{} f(w,r)=1 \hat{} (c^{-1}(j(w,r))-i(c^{-1}(j(w,r))) \neq 0)\}$ $\alpha_{w,r,i(c^{-1}(j(w,r)))} - c^{-1}((w,r)) + i(c^{-1}(j(w,r)) \leq 0$, which stipulates that a computing task that starts fractionally within a clock tick cannot execute for the full duration of the clock tick.

Constraint Group (8): $\forall (w,r) \in \{W \times R \mid g(w,r) > 0 \hat{} c^{-1}(e(w)) - i(c^{-1}(e(w))) \neq 0\} - \alpha_{w,r,i(c^{-1}(e(w)))} - i(c^{-1}(e(w))) + c^{-1}(e(w)) \leq 0$, which stipulates that a computing task may execute for a fraction of a clock tick in the last clock tick of an initial computing task.

Constraint Group (9): $\forall (w,r,t) \in \{W \times R \times T \mid g(w,r) > 0 \hat{} t > 0 \hat{} t < i(c^{-1}(g(w,r)))\}$ $1 \leq \alpha_{w,r,t} \leq 1$, which stipulates that an initial computing task is to execute at the predefined maximum speed up to but not including its last clock tick.

Constraint Group (10): $\forall (w,r,t) \in \{W \times R \times T \mid r \neq \kappa \hat{} t > 0 \hat{} t < i(c^{-1}(j(w,r))) \hat{} f(w,r)=1\}$ $0 \leq \alpha_{w,r,t} \leq 0$, which stipulates that each computing task may not execute before its designated start time.

Constraint Group (11): $\forall (w,r,t) \in \{W \times R \times T \mid r \neq \kappa \hat{} t > 0 \hat{} f(w,r)=1\}$ $\alpha_{w,r,t} - \beta_{w,r} \leq 0$, which stipulates that each computing task is to execute on its assigned resource.

Constraint Group (12): $\forall (w,d) \in \{W \times D \mid (\Sigma_{z \in W} {}_{|b(w,d)=1\hat{}b(z,d)=1}1)=1\}$ $0 \leq \beta_{w,k} \leq 0$, which stipulates that a computing task is to be executed if it is the only computing task that produces a dependency. If this constraint does not exist, then a computing task that has no other computing tasks consuming the dependencies may be terminated as there is no need to execute such a computing task.

Constraint Group (13): $\forall (r,t) \in \{R \times T \mid t > 0\} - k(r) + \Sigma_{w \in W} {}_{|f(w,r)=1} h(w,r)*\alpha_{w,r,t} \leq 0$, which stipulates that number of allocated resources does not exceed the number of resources that are available.

Constraint Group (14): $\forall (d,r) \in \{D \times R \mid r \neq \kappa\}$ $0 \leq \gamma_{d,r,0} \leq 0$, which stipulates that no dependencies may be satisfied using a reserved time slot.

Constraint Group (15): $\forall (d,r,t) \in \{D \times R \times T \mid t > 0 \hat{} r \neq \kappa\}$ $\delta_{d,r,t} + \gamma_{d,r,t} \leq 1$ Constraint Group (16): $\forall (d,r,t) \in \{D \times R \times T \mid t > 0 \hat{} r \neq \kappa\}$ $\delta_{d,r,t} + \Sigma_{z \in W} {}_{|f(z,r)=1 \hat{} b(z,d)=1} \alpha_{d,z,t-1} \leq 1$ Constraint Group (17): $\forall (d,r,t) \in \{D \times R \times T \mid t > 0 \hat{} r \neq k\} - \gamma_{d,r,t} - \delta_{d,r,t} - \Sigma_{z \in W} {}_{|f(z,r)=1 \hat{} b(z,d)=1} \alpha_{d,z,t-1} \leq -1$ Constraint Group (18): $\forall (d,r,t) \in \{D \times R \times T \mid t > 0 \hat{} r \neq \kappa\}$ $\delta_{d,r,t} + \gamma_{d,r,t} \leq 1$ Constraint Groups (15)(16)(17)(18) stipulate that a dependency unsatisfied at time t−1 and not executing at time t−1 implies the dependency is unsatisfied at time t.

Constraint Group (19): $\forall (d,r,t,w) \in \{D \times R \times T \times D \mid t > 0 \hat{} r \neq \kappa \hat{} f(w,r)=1 \hat{} b(w,d)=1\}$ $\alpha_{w,r,t} + \gamma_{w,r,t} \leq 1$, which stipulates that computing tasks that produce dependencies and that are executing cannot have their dependencies satisfied at the same time.

Constraint Group (20): $\forall (d,r,t) \in \{D \times R \times T \mid t > 0 \hat{} t < t_{end} \hat{} r \neq K\}$ $\gamma_{d,r,t} - \gamma_{d,r,t+1} \leq 0$, which stipulates that a dependency satisfied at a time t will be satisfied for all times after t.

Accordingly, the linear model 106 constructed by the model construction module 208 may include the input parameters, basic definitions, matrix variables, and constraints as described above. In turn, the linear model 106 may be used to solve the linearly expressible goal.

The linear solver module 210 may use the linear model(s) that are constructed by the model construction module 208 to obtain the shadow prices 116. As described above, each of the shadow prices may represent a priority value of a corresponding computing task. In various embodiments, the linear solver module 210 may use a linear programming algorithm (e.g., Dantzig's simplex algorithm, Karmarkar's algorithm, branch-and-cut method with Dantizig's simplex algorithm, etc.) to solve the linear resource constraints (e.g., linear resource constraints 112) in the linear model (e.g., linear model 106), such as the constraints defined by constraint groups (1)-(20).

Once the constraints are solved, the linear solver module 210 may then obtain the shadow prices 116 for a set of resource time prediction constraints that are solved from the linear model (e.g., linear model 106). The resource time prediction constraints may be constraints that are specified by the constraint group (6), which stipulates that each computing task has to complete its execution in the amount of time that it is predicted to execute using an allocated resource. Accordingly, each of the computing tasks, such as the computing tasks 108(1)-108(N), may have a corresponding resource time prediction constraint. In at least one embodiment, the shadow prices may be obtained using a dual problem solving technique, such as the Lagrangian dual problem technique. The linear solver module 210 may save the resultant dual prices $l_{w,r}$, which may be the shadow prices 116, in a database table that is stored to the data store 218.

The task prioritization module 212 may maintain a real-time computing task queue 220 of computing tasks, such as the computing tasks 108(1)-108(N). The computing tasks in the computing task queue 220 may be ordered according to their corresponding priority values (i.e., shadow prices). The computing task queue 220 may be maintained such that a computing task with the highest priority value is to be executed first, while a computing task with the low priority value is be executed last. In at least one embodiment, the computing task queue 220 that is maintained by the task prioritization module 212 may be mathematically expressed as:

$$Q = \{w \in \forall \mid W \ (d \in D \mid a(w,d)=1), \text{the dependency } d \text{ is satisfied}\}.$$

The task allocation module 214 may select a computing task with a highest priority value (i.e., shadow price) at any instance to an available computing resource for execution using the available computing resource, provided that the computing task is able to use the available computing resource. As described above, an available computing resource may include data that is stored in one of multiple data warehouses, a data processing capability of one of multiple servers, or a combination of data and data processing capacity of the data warehouse or the server. In at least one embodiment, the selection by the task allocation module 214 from the computing task queue 220 may be expressed as:

For each r∈ D that has an available computing resource avail(r):
  (a) For each q∈Q Q |h(q,r)<=avail(r) task
    Let $$\text{priority}(q) = \begin{cases} \text{dual}_{q,r} & \text{if the computing task } q \text{ exists in the database} \\ \frac{\sum_{w \in W} \text{dual}_{w,r}}{\sum_{w \in W} 1} & \text{otherwise} \end{cases}$$

(b) Let the computing task with the highest priority (a) execute on resource r. In at least one embodiments, ties between priorities of multiple computing tasks maybe broken randomly by the task allocation module 214.

The user interface module 216 may enable a user to interact with the various modules of the task prioritization engine 102 using a user interface. The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. The user interface module 216 may enable the user to provide various inputs to the model construction module 208 or select a particular linear programming algorithm to solve the constraints. The user interface module 216 may further enable the user to set up a frequency for the recalculation of the shadow prices to take into account any updates to the inputs of the linear model, or request an immediate recalculation of the shadow prices when there are changes to the inputs of the linear model.

The data store 218 may store one or more linear models, such as the linear model 106, which are developed by the model construction module 208. The data store 218 may also store the computing task queue 220 that is maintained by the task prioritization module 212, as well as the database table of the shadow prices 116.

Illustrative Operations

Figure 3:
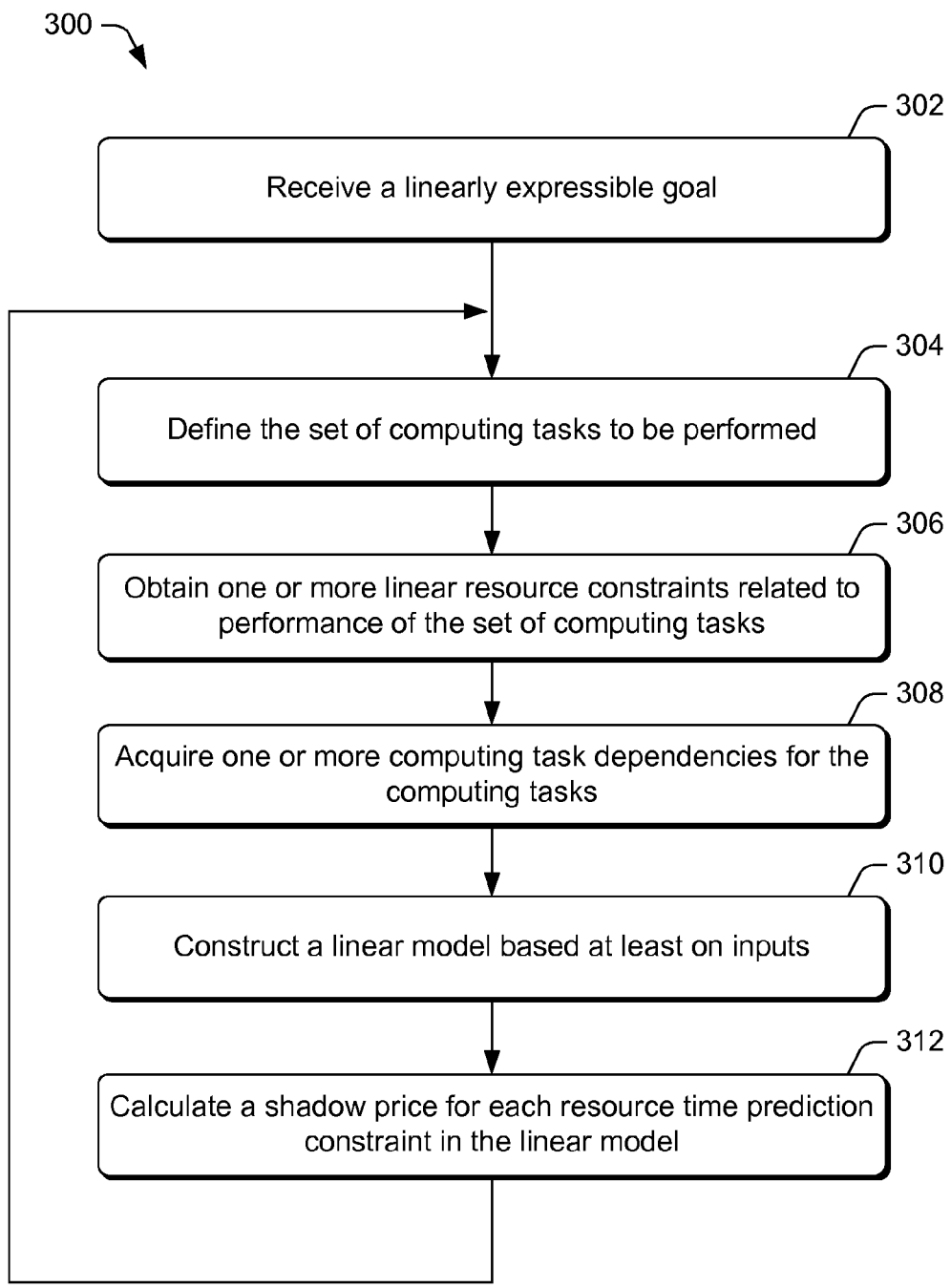
FIG. 3 is a flow diagram of an illustrative process for performing a set of recurring operations associated with resource constrained task scheduling using linear programming.
Figure 4:
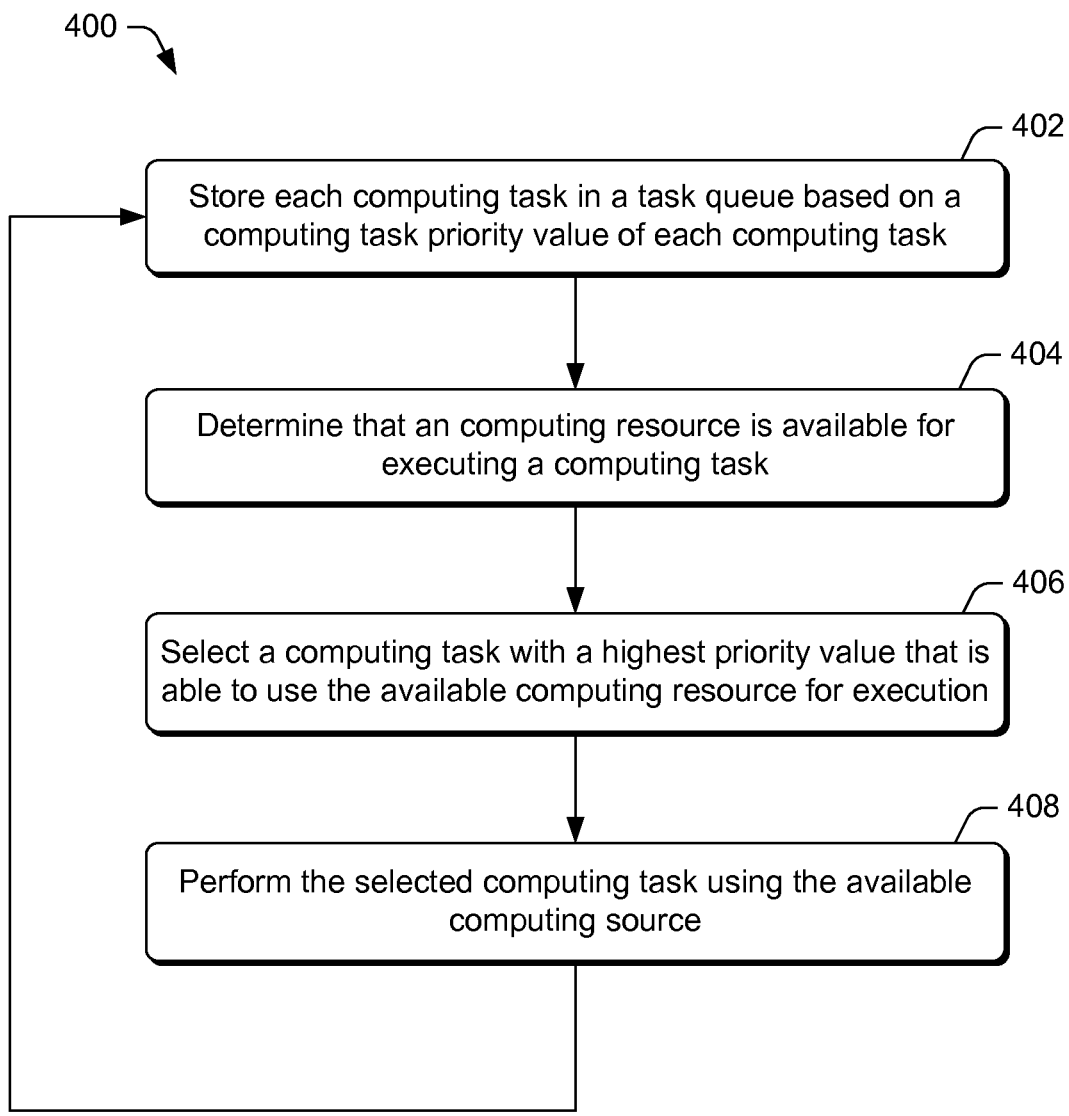
FIG. 4 is a flow diagram of an illustrative process for real-time prioritization of tasks during resource constrained task scheduling using linear programming.

FIGS. 3 and 4 show illustrative processes 300 and 400 that implement techniques that implement resource constrained task scheduling. Each of the processes 300 and 400 is illustrated as a collection of blocks in a logical flow graph, which represents a sequence of operations that may be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and so forth that perform particular functions or implement particular abstract data types. The order in which the operations are described is not intended to be construed as a limitation, and any number of the described blocks can be combined in any order and/or in parallel to implement the process. For discussion purposes, the processes 300 and 400 are described with reference to the computing environment 100 of FIG. 1 that includes the computing device 104 as described with reference to FIG. 2.

FIG. 3 is a flow diagram of an illustrative process 300 for performing a set of recurring operations associated with resource constrained task scheduling using linear programming. At block 302, the model construction module 208 may receive a linearly expressible goal 110. The linearly expressible goal 110 may be inputted to the model construction module 208 by a user. The linearly expressible goal 110 may be an objective or a combination of objectives that are solvable using linear programming. In at least one embodiment, the linearly expressible goal may be the minimization of cost associated with the performance of the computing tasks.

At block 304, the model construction module 208 may define the set of computing tasks 108(1)-108(N) to be performed, which may be based on user selection. In various embodiments, each computing task may be a computing task that is performed using a computing resource. For example, a computing task may be the execution of a query on data in a database, the processing of input data using a data processing server, or the return of a report based on data stored in a data warehouses.

At block 306, the model construction module 208 may obtain one or more linear resource constraints 112 related to performance of the computing tasks 108(10-108(N). The one or more linear resource constraints 112 may be inputted by the user. The linear resource constraints 112 may place limitations on the performance of the computing tasks. For example, the linear resource constraints 112 may reflect the limited storage capacity of each data warehouse or the limited number of data servers to fulfill data processing requests.

At block 308, the model construction module 208 may acquire one or more task dependencies 114 for the computing tasks. The one or more task dependencies 114 may be inputted by the user. The one or more task dependencies 114 may affect the order in which one or more computing tasks may be executed. For example, a task dependency may be a stipulation that a first computing task is to be executed prior to the execution of a second computing task. Another example task dependency may be that a particular task is to be executed by a specific time deadline.

At block 310, the model construction module 208 may construct a linear model 106 based at least one the inputs of linearly expressible goal 110, the set of computing tasks to be performed 108(1)-108(N), the linear resource constraints 112, and the task dependencies 114.

At block 312, the linear solver module 210 may calculate a shadow price for each of resource time prediction constraint in the linear model 106. In at least one embodiment, the linear resource constraints 112 may include constraints specified by one or more of the constraint groups (1)-(20) described above. The resource time prediction constraints may be constraints that are specified by the constraint group (6), which stipulates that each task has to complete its execution in the amount of time that it is predicted to execute using an allocated resource. In various embodiments, a linear programming algorithm may be used by the linear solver module 210 to solve the linear resource constraints 112. Subsequently, the shadow prices 116 may be obtained from the solved resource time prediction constraints using a dual problem solving technique, such as the Lagrangian dual problem technique. Each of the shadow prices 116 may represent a priority value for a corresponding computing task of the set of computing tasks 108(1)-108(N).

In some embodiments, the process 300 may loop back to block 304 so that the model construction module 208 may repeat the creation of a linear model based on new or updated inputs of computing tasks to be performed, linear resource constraints, and/or task dependencies. Further, the calculation of the shadow prices may also be repeated. Such repetitions may also be implemented on a periodic basis as part of routine.

FIG. 4 is a flow diagram of an illustrative process 400 for real-time prioritization of tasks during resource constrained task scheduling. At block 402, the task prioritization module 212 may store each of the computing tasks 108(1)-108(N) in the task queue 220 based on a computing task priority value of each computing task. In various embodiments, the computing task priority value of each computing task may be a corresponding shadow price that is calculated by the linear solver module 210. The computing task queue 220 may be implemented in the data store 218. In some embodiments, the task prioritization module 212 may assign a default average priority value to each computing task that is newly added to the computing tasks 108(1)-108(N) when the calculation of the priority values for existing computing tasks is already complete. The task prioritization module 212 may also use the default average value assigned to a newly added computing task to order the newly added computing task relative to one or more other computing tasks in the task queue 220.

At block 404, the task allocation module 214 may determine that a computing resource is available for executing a computing task. In various embodiments, the computing resource may include data that is stored in one of multiple data warehouses, a data processing capability of one of multiple servers, or a combination of data and data processing capacity of the data warehouse or the server.

At block 406, the task allocation module 214 may select a computing task with a highest priority value that is able to use the available computing resource from the task queue 220 for execution. In an instance in which there are multiple computing tasks with the same priority value that are able to use the available computing resource, the task allocation module 214 may randomly select one of such multiple computing tasks for execution.

At block 408, the task allocation module 214 may assign the select computing task to the available computing resource, so that the selected computing task may be performed by the available computing resource. Subsequently, the process 400 may loop back to block 402 so that the task queue 220 may be updated and additional computing tasks may be selected for execution.

In summary, the techniques described herein may use linear programming to calculate a shadow price for each resource time prediction constraint in a linear model, in which each of the shadow prices represents a priority value for a corresponding computing task. The calculation of the shadow prices for the computing tasks may be a slower step that consumes significant time and computing resources. Thus, by structuring the linear programming to calculate the shadow prices beforehand or on an infrequent basis, the techniques described herein may achieve real-time task execution prioritization in most scenarios.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method, comprising:
    constructing a linear model using a matrix variable having a value that represents a speed at which a computing task of a set of computing tasks is executing on a computing resource at a particular time, the linear model including the set of computing tasks, a linearly expressible goal of completing the set of computing tasks in a shortest duration of time, one or more linear resource constraints, and one or more computing task dependencies;
    solving the one or more linear resource constraints included in the linear model using at least one of Dantzig's simplex algorithm, Karmarkar's algorithm, or a branch-and-cut method with Dantzig's simplex algorithm to obtain resource time prediction constraints;
    calculating, using one or more hardware processors, shadow prices for the resource time prediction constraints using a dual problem solving technique, wherein individual shadow prices represent a priority value for a corresponding computing task;
    storing individual computing tasks of the set of computing tasks in a queue ordered according to corresponding shadow prices;
    selecting, from the queue, a particular computing task with a highest priority value indicated by the corresponding shadow price that is able to use an available computing resource; and
    executing, by the available computing resource, the particular computing task with the highest priority value selected from the queue.

2. The computer-implemented method of claim 1, wherein at least one computing task in the set of computing tasks includes generating a corresponding report using data stored in a data warehouse, the one or more linear resource constraints include at least one of a storage capacity limitation of a data warehouse or a bandwidth of the data warehouse, and the one or more computing task dependencies includes a dependency specifying that a first computing task is to execute before an execution of a second computing task.

3. The computer-implemented method of claim 1, further comprising recalculating the shadow prices in response to an indication that (i) the set of computing tasks was updated to include at least one new computing task, (ii) a change occurred to the one or more linear resource constraints or the one or more computing task dependencies, or (ii) a predetermined time period has passed.

4. A computer-implemented method, comprising:
    constructing a linear model that includes a set of computing tasks, a linearly expressible goal for the set of computing tasks, one or more linear resource constraints, and one or more computing task dependencies;
    solving the one or more linear resource constraints included in the linear model using Dantzig's simplex algorithm, Karmarkar's algorithm, or a branch-and-cut method with Dantzig's simplex algorithm to obtain a plurality of resource time prediction constraints, wherein the plurality of resource time prediction constraints stipulate that individual computing tasks have to complete execution using an allocated computing resource in a corresponding predicted amount of time;

determining, using one or more hardware processors, shadow prices for individual resource time prediction constraints of the plurality of resource time prediction constraints in the linear model using a Lagrangian dual problem technique, wherein individual shadow prices represent a priority value for a corresponding computing task;

selecting a particular computing task with a highest priority value that is able to use an available computing resource; and executing, by the available computing resource, the particular computing task with the highest priority value.

5. The computer-implemented method of claim 4, further comprising recalculating the shadow prices for the individual resource time prediction constraints of the plurality of resource time prediction constraints in response to occurrence of at least one of the following: the set of computing tasks is updated to include at least one new computing task, a change occurs to the one or more linear resource constraints or the one or more computing task dependencies, or a predetermined time period has passed.

6. The computer-implemented method of claim 4, further comprising assigning a default average priority value to a new computing task when the new computing task is added to the set of computing tasks following the determining the shadow prices for the individual resource time prediction constraints of the plurality of resource time prediction constraints.

7. The computer-implemented method of claim 4, wherein at least one computing task in the set of computing tasks includes generating a report using data stored in a data warehouse.

8. The computer-implemented method of claim 4, wherein the corresponding predicted amount of time for an individual computing task is an exponentially weighted moving average of past execution completion times of the individual computing task, a simple linear regression by least squares of the past execution completion times, or a support vector machine regression of the past execution completion times.

9. The computer-implemented method of claim 4, wherein the linearly expressible goal includes one or more objectives that are solved using linear programming.

10. The computer-implemented method of claim 4, wherein the one or more linear resource constraints include at least one of a storage capacity limitation of a data warehouse or a bandwidth of the data warehouse.

11. The computer-implemented method of claim 4, wherein the one or more computing task dependencies includes a dependency specifying that a first computing task is to execute before an execution of a second computing task.

12. The computer-implemented method of claim 4, wherein the determining the shadow prices for the individual resource time prediction constraints includes calculating individual shadow prices according to a series of clock ticks that are evenly spaced apart or exponentially spaced apart.

13. The computer-implemented method of claim 4, wherein the selecting includes randomly selecting the particular computing task when the particular computing task and an additional computing task that is able to use the available computing resource have identical priority values.

14. The computer-implemented method of claim 4, wherein the one or more linear resource constraints includes at least one of a constraint stipulating that an individual computing task is not to be terminated if the individual computing task depends on another computing task, a constraint stipulating that the individual computing task is to execute on one computing resource, a constraint stipulating that an additional computing task is to execute if the additional computing task is an initial task, a constraint stipulating that individual consuming computing tasks cannot execute on a computing resource if a dependency being consumed has not been satisfied, or a constraint stipulating that executing computing tasks that produce dependencies cannot have the dependencies satisfied at an identical time.

15. The computer-implemented method of claim 4, further comprising storing the individual computing tasks of the set of computing tasks in a queue ordered according to corresponding priority values as indicated by corresponding shadow prices.

16. A non-transitory computer readable media storing computer-executable instructions that, when executed, cause one or more hardware processors to perform acts comprising:

constructing a linear model that includes a set of computing tasks;

solving one or more linear resource constraints included in the linear model using Dantzig's simplex algorithm, Karmarkar's algorithm, or a branch-and-cut method with Dantzig's simplex algorithm to obtain a plurality of resource time prediction constraints;

calculating shadow prices for individual resource time prediction constraints of the plurality of resource time prediction constraints in the linear model using a Lagrangian dual problem technique, wherein individual shadow prices represent a priority value for a corresponding computing task of the set of computing tasks;

selecting a particular computing task with a highest priority value as indicated by a corresponding shadow price, the particular computing task being selected to use an available computing resource; and executing the particular computing task with the highest priority value using the available computing resource.

17. The non-transitory computer readable media of claim 16, wherein the linear model includes a linearly expressible goal for the set of computing tasks and one or more computing task dependencies.

18. The non-transitory computer readable media of claim 16, wherein the plurality of resource time prediction constraints stipulate that an individual computing task is to complete execution using an allocated resource in a corresponding predicted amount of time.

19. The non-transitory computer readable media of claim 18, wherein the corresponding predicted amount of time is an exponentially weighted moving average of past execution completion times of the individual computing task, a simple linear regression by least squares of the past execution completion times, or a support vector machine regression of the past execution completion times.

20. The non-transitory computer readable media of claim 16, wherein the selecting includes randomly selecting the particular computing task when the particular computing task and an additional computing task that is able to use the available computing resource have an identical shadow price.

21. The non-transitory computer readable media of claim 16, the acts further comprising storing individual computing tasks of the set of computing tasks in a queue ordered according to corresponding priority values as indicated by corresponding shadow prices.

22. An electronic device, comprising:
a hardware processor; and
memory storing components executable by the hardware processor, the components comprising:
- a model construction component to construct a linear model having at least a set of computing tasks and a linearly expressible goal that includes one or more objectives that are solved using linear programming;
- a linear solver component to:
  - solve one or more linear resource constraints included in the linear model using Dantzig's simplex algorithm, Karmarkar's algorithm, or a branch-and-cut method with Dantzig's simplex algorithm to obtain a plurality of resource time prediction constraints; and
  - calculate shadow prices for individual resource time prediction constraints of the plurality of resource time prediction constraints specified in the linear model using a Lagrangian dual problem technique, wherein individual shadow prices represent a priority value for a corresponding computing task of the set of computing tasks; and
- a task allocation component to select a particular computing task with a highest priority value as indicated by a corresponding shadow price that is able to use an available computing resource for execution using the available computing resource.

23. The electronic device of claim 22, wherein the model construction component is configured to construct the linear model based at least on the set of computing tasks, the linearly expressible goal for the set of computing tasks, the one or more linear resource constraints, and one or more computing task dependencies.

24. The electronic device of claim 22, wherein the plurality of resource time prediction constraints stipulate that an individual computing task is to complete execution using an allocated resource in a corresponding predicted amount of time.

25. The electronic device of claim 24, wherein the corresponding predicted amount of time is an exponentially weighted moving average of past execution completion times of the individual computing task, a simple linear regression by least squares of the past execution completion times, or a support vector machine regression of the past execution completion times.

26. The electronic device of claim 22, further comprising a task prioritization component to store individual computing tasks in the set of computing tasks in a queue ordered according to corresponding priority values as indicated by corresponding shadow prices.

* * * * *